(12) United States Patent
Lee et al.

(10) Patent No.: US 8,471,489 B2
(45) Date of Patent: Jun. 25, 2013

(54) POWER REGULATOR AND REMOTE POWER CONTROL DEVICE

(75) Inventors: Sang Cheol Lee, Seoul (KR); Young Sic Kim, Anyang-si (KR); Jong Sik Bae, Seoul (KR)

(73) Assignee: PMD Networks Inc., Seoul (KR)

( * ) Notice: Subject to any disclaimer, the term of this patent is extended or adjusted under 35 U.S.C. 154(b) by 0 days.

(21) Appl. No.: 13/148,907

(22) PCT Filed: Mar. 25, 2010

(86) PCT No.: PCT/KR2010/001830
§ 371 (c)(1),
(2), (4) Date: Aug. 10, 2011

(87) PCT Pub. No.: WO2010/110604
PCT Pub. Date: Sep. 30, 2010

(65) Prior Publication Data
US 2011/0316498 A1    Dec. 29, 2011

(30) Foreign Application Priority Data
Mar. 25, 2009    (KR) .................. 10-2009-0025604

(51) Int. Cl.
*H05B 41/40*    (2006.01)

(52) U.S. Cl.
USPC ........................... 315/276; 315/291; 323/255

(58) Field of Classification Search
USPC .................. 363/20, 24, 25, 21.15, 37, 56.07, 363/56.11, 96, 97, 144, 146; 323/222, 223, 323/225, 215, 217, 271, 272, 282–285, 323/255–265, 340; 315/194, 225, 274, 278, 315/279, 291, 397, 347; 307/38, 66, 83, 87, 307/85, 113
See application file for complete search history.

(56) References Cited

U.S. PATENT DOCUMENTS

| | | | |
|---|---|---|---|
| 4,591,779 A | * | 5/1986 | Carpenter et al. ............ 323/301 |
| 5,013,977 A | * | 5/1991 | Droho .......................... 315/289 |

(Continued)

FOREIGN PATENT DOCUMENTS

| | | |
|---|---|---|
| JP | 07-007978 A | 1/1995 |
| JP | 09-247857 A | 9/1997 |

(Continued)

OTHER PUBLICATIONS

International Search Report for PCT Application No. PCT/KR2010/001830. Korean Intellectual Property Office. Oct. 28, 2010.

*Primary Examiner* — Rajnikant Patel

(57) ABSTRACT

A power regulator 130 includes a power input line 181, a primary winding connected to the power input line 181 and wound on a core, a secondary winding, at least part of the secondary winding being in common with the primary winding, at least one tap 132, 133, and 134 connected to the primary winding at a predetermined position thereof to specify respective numbers of turns of the primary winding and the secondary winding, at least one switch S1, S2, and S3 having one end connected respectively to the at least one tap 132, 133, and 134 and another end connected to a common line 183 to change the respective numbers of turns of the primary winding and the secondary winding, and an output line 182 for outputting power that the secondary winding generates as the secondary winding is excited by the primary winding, wherein the respective numbers of turns of both the primary winding and the secondary winding are determined as one of the at least one switch S1, S2, and S3 is closed.

8 Claims, 6 Drawing Sheets

U.S. PATENT DOCUMENTS

| | | | | |
|---|---|---|---|---|
| 5,119,012 A | * | 6/1992 | Okamura | 323/258 |
| 5,325,282 A | * | 6/1994 | Bansard | 363/21.13 |
| 5,477,113 A | * | 12/1995 | Christoffersson | 315/278 |
| 5,602,462 A | * | 2/1997 | Stich et al. | 323/258 |
| 5,767,744 A | * | 6/1998 | Irwin et al. | 330/297 |
| 5,773,970 A | * | 6/1998 | Dohnal et al. | 323/341 |
| 5,808,454 A | * | 9/1998 | Chung | 323/255 |
| 6,087,738 A | * | 7/2000 | Hammond | 307/17 |
| 6,100,673 A | * | 8/2000 | Bair et al. | 323/255 |
| 6,417,651 B1 | * | 7/2002 | Kronberg | 323/255 |
| 6,762,594 B1 | * | 7/2004 | Hauer | 323/255 |
| 7,049,795 B2 | * | 5/2006 | Beckwith | 323/258 |
| 7,154,251 B2 | | 12/2006 | Fattohi | |
| 7,250,743 B2 | * | 7/2007 | McVicar | 323/255 |

FOREIGN PATENT DOCUMENTS

| | | |
|---|---|---|
| JP | 2002-023864 A | 1/2002 |
| JP | 2003-274557 A | 9/2003 |
| JP | 2004-235587 A | 8/2004 |
| JP | 2007-174719 A | 7/2007 |
| KR | 20-2000-0021277 U | 12/2000 |
| KR | 10-2002-0050488 A | 6/2002 |
| KR | 10-2006-0025702 A | 3/2006 |
| KR | 10-2008-0103578 | 11/2008 |

* cited by examiner

POWER REGULATOR AND REMOTE POWER CONTROL DEVICE

PRIORITY

The present application claims priority under 35 U.S.C. §371 to PCT Application PCT/KR2010/001830, filed on Mar. 25, 2010, which claims priority to Korean Patent Application No. 10-2009-0025604, filed on Mar. 25, 2009, the disclosures of which are hereby incorporated by reference in their entireties.

BACKGROUND OF THE INVENTION

1. Field of the Invention

The present invention relates to a power regulator and a remote power control device, and more particularly to a remote power control device that remotely controls power.

2. Description of the Related Art

A power source for supplying power to residential or industrial sites has many unstable factors as the amount of load or external environments change. A scheme for supplying stable power to a load under such a situation has been suggested. In this case, generally, coils are wound according to a desired voltage or a number of output taps are provided to output various voltages.

In an exemplary scheme, a plurality of taps (a, b, c, . . . ) is provided on a secondary winding (generally including a variable number of turns) that is excited by a primary winding (generally including a fixed number of turns) to output various voltage levels.

In this case, when the secondary winding is designed such that each tap reduces the output voltage by 5V when a voltage of 220V is input to the primary winding, 200V may be output from the first tap (a), 205V may be output from the second tap (b), and 210V may be output from the third tap (c). Thus, discrete output voltages, which are considerably different from each other, are selectively output. Accordingly, the conventional scheme does not provide as much accurate and fine voltage control as the user desires.

In addition, according to the conventional scheme, it is difficult to perform stable power control in a situation in which a power control device is installed at a location which the user cannot easily access such outdoors, on a high-rise, or at a dangerous location. Further, the conventional scheme also has a problem in that the user cannot monitor and control power in a situation in which power control is abnormally performed.

SUMMARY OF THE INVENTION

Therefore, the present invention has been made in view of the above problems, and it is an object of the present invention to provide a remote power control device in which the respective numbers of both a primary winding and a secondary winding are changed to select voltage, thereby enabling fine and accurate remote power control.

It is another object of the present invention to provide a remote power control device that collects data using a remote monitoring function that monitors voltage, current, and the like of a primary power source and performs power control based on the collected data, thereby enabling power control more suitable for the installed location.

It is another object of the present invention to provide a power regulator in which the respective numbers of both a primary winding and a secondary winding are changed to output voltage, thereby enabling fine and accurate voltage transformation.

In accordance with the present invention, the above and other objects can be accomplished by the provision of a power regulator including a power input line, a primary winding connected to the power input line and wound on a core, a secondary winding, at least part of the secondary winding being in common with the primary winding, at least one tap connected to the primary winding at a predetermined position thereof to specify respective numbers of turns of the primary winding and the secondary winding, at least one switch having one end connected respectively to the at least one tap and another end connected to a common line to change the respective numbers of turns of the primary winding and the secondary winding, and an output line for outputting power that the secondary winding generates as the secondary winding is excited by the primary winding, wherein the respective numbers of turns of both the primary winding and the secondary winding are determined as one of the at least one switch is closed.

When the number of turns of the primary winding is larger than the number of turns of the secondary winding and the at least one tap is sequentially connected from a lower end of the primary winding, one of the at least one tap connected to a closed one of the switches may output higher power as the one of the at least one tap is closer to the lower end of the primary winding.

The switch may include at least one of a TRIAC and an SSR.

In accordance with the present invention, the above and other objects can also be accomplished by the provision of a remote power control device including the power regulator described above, a sensor unit connected to at least one of a power input line and a power output line of the power regulator to sense at least one of an input power and an output power, and a controller for comparing power sensed by the sensor unit with a preset value and changing output power of the power regulator based on the comparison.

The sensor unit may sense current or voltage applied to at least one of the power input line and the power output line.

The controller may switch one of at least one switch of the power regulator to change an output power of the power regulator.

The controller may decrease the output power if the power sensed by the sensor unit is higher than the preset value and increase the output power if the power sensed by the sensor unit is less than the preset value.

The controller may uniformly maintain the output power of the power regulator for a predetermined time required to start a load connected to the power output line.

The controller may uniformly maintain the output power of the power regulator at the changed output power of the power regulator for a predetermined time after the output power of the power regulator is changed.

The remote power control device may further include a communication unit for transmitting information regarding the input power or the output power sensed by the sensor unit out of the remote power control device and receiving information regarding change of the output power of the power regulator from outside the remote power control device.

The remote power control device may further include a remote monitoring controller for remotely controlling the output power of the power regulator based on user input.

The remote power control device may further include a display for displaying information transmitted from the communication unit.

The present invention has a variety of advantages. For example, in the remote power control device according to the present invention, the respective numbers of both a primary winding and a secondary winding can be changed to select voltage, thereby enabling fine and accurate remote power control.

In addition, the remote power control device collects data using a remote monitoring function that monitors voltage, current, and the like of a primary power source and performs power control based on the collected data, thereby enabling power control more suitable for the installed location.

Further, in the power regulator according to the present invention, the respective numbers of both a primary winding and a secondary winding are changed to output voltage, thereby enabling fine and accurate voltage transformation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
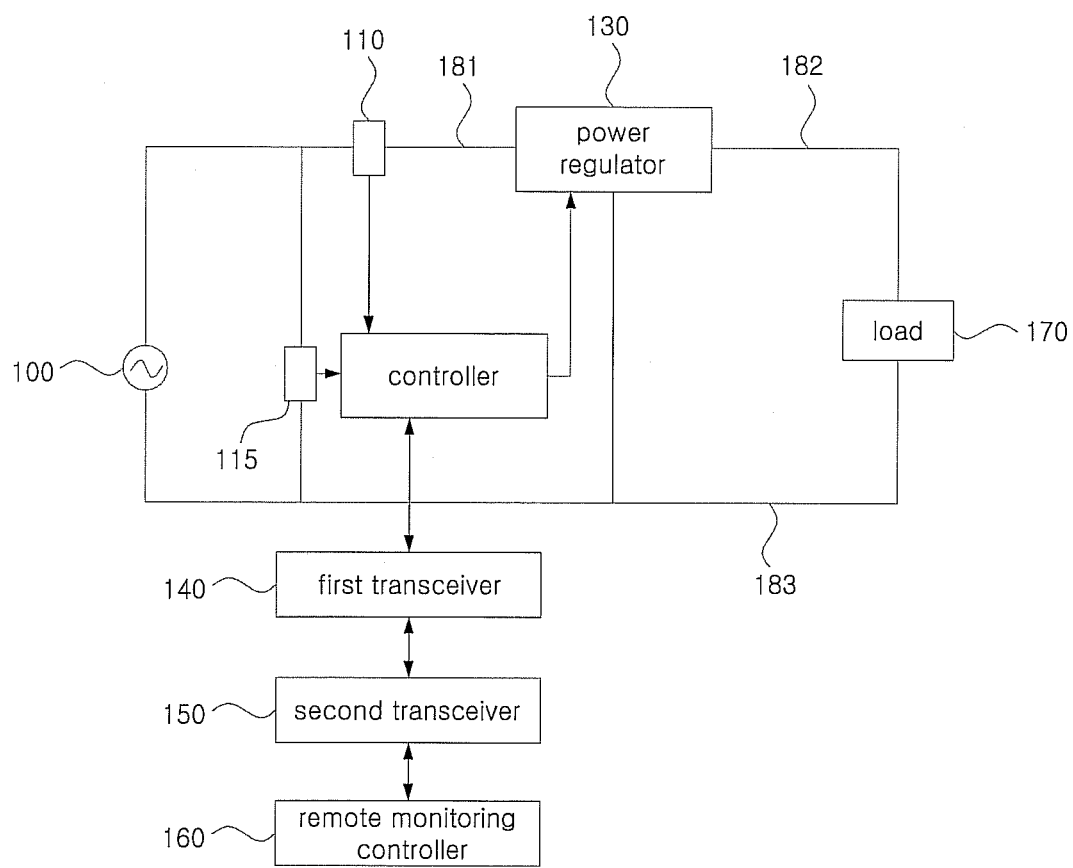
FIG. 1 is a circuit block diagram of a remote power control device for remotely controlling power according to an embodiment of the present invention.

Preferred embodiments of the present invention will now be described with reference to the accompanying drawings. FIG. 1 is a circuit block diagram of a remote power control device for remotely controlling power according to an embodiment of the present invention. The remote power control device shown in FIG. 1 includes a power source 100, a sensor unit 110, a controller 120, a power regulator 130, a first transceiver 140, a second transceiver 150, a remote monitoring controller 160, and a load 170. The following are details of these components.

The power source 100 is a power supply unit that supplies power to each component, for example, to the controller 120 and the power regulator 130. Generally, the power source 100 uses AC power received from a power line. Generally, power transmitted from a distribution substation (secondary substation) is reduced in voltage to a distribution voltage through a transformer and the reduced voltage power is then provided to a building or factory or is provided to a pole transformer through a distribution line. In the latter case, the power is again reduced in voltage to about 220V~380V through the pole transformer and is then provided to a residence. Thus, general commercial power is supplied to the power source 100. However, this is only illustrative and the present invention is not limited to supply of commercial power to the power source 100.

The sensor unit 110 is located between the power source 100 and the power regulator 130 to sense current flowing from the power source 100 to the power regulator 130. To accomplish this, the sensor unit 110 includes a current sensor. Of course, the sensor unit 110 may also include a voltage sensor to sense voltage rather than current. Thus, the sensor unit 110 detects current or voltage or simultaneously detects current and voltage and transmits the detected value to the controller 120.

Although FIG. 1 illustrates that power input to the power regulator 130 is sensed for better understanding of the present invention, it is also possible to sense power output from the power regulator 130. Of course, here, it is possible to detect current or voltage or to simultaneously detect current and voltage.

The remote power control device may also include a sensor unit 110 that can sense both the input and output of the power regulator 130.

The controller 120 generally includes a microprocessor, a number of memory elements, and the like. The controller 120 processes signals and data received from the components of the remote power control device and exchanges signals and data with the components. To accomplish this, the controller 120 stores data, a program, and the like and executes an algorithm for remote power control.

That is, the controller 120 receives data regarding sensed current or voltage from the controller 120 and compares the received data with preset data. If the measured current or voltage is higher or lower than a preset level, the controller 120 transmits a control signal to the power regulator 130 to control the power and transmits information regarding this control process to the second transceiver 150 through the first transceiver 140. This power control process will be described later with reference to a flow chart shown in FIG. 6.

Figure 2:
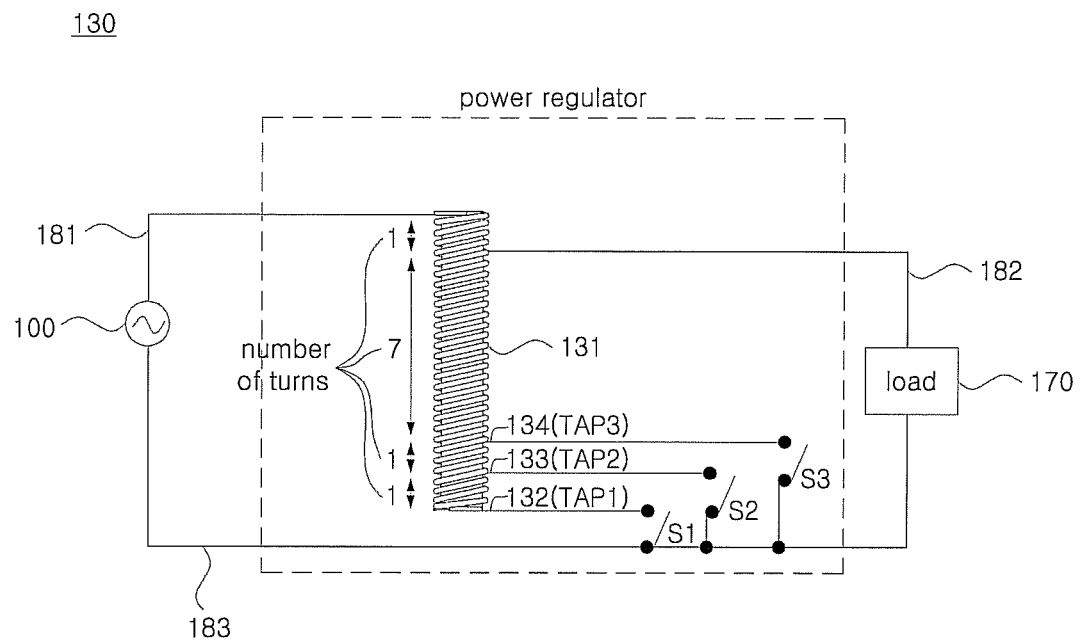
FIG. 2 is an enlarged circuit diagram showing only the power regulator for power control in the remote power control device.

The power regulator 130 receives a command from the controller 120 and increases or decreases supply voltage so as to supply stable power to the load 170. Of course, the power regulator 130 may receive power from the power source 100. A circuit for performing a process for increasing or decreasing voltage is shown in FIG. 2. This circuit will be described later with reference to FIGS. 2 to 5.

Referring back to FIG. 1, the remote power control device includes the first transceiver 140, the second transceiver 150, and the remote monitoring controller 160 for remote control. In order to transmit or receive data and signals, the first transceiver 140 and the second transceiver 150 may use wired communication such as wired LAN or RS-485 or use wireless communication such as Bluetooth, wireless LAN, Wibree, and infrared communication.

Accordingly, the first transceiver 140 receives data regarding sensed current or voltage from the controller 120 and transmits the received data to the second transceiver 150 or receives information regarding a value set or changed by the user or the like from the remote monitoring controller 160 through the second transceiver 150.

The remote monitoring controller 160 serves to provide information indicating whether or not power control is being stably performed, which is determined based on information transmitted from the controller 120, to the user in real time. To accomplish this, the remote monitoring controller 160 also includes a microprocessor, memory, and the like and stores data, a program, and the like and executes a remote monitoring algorithm through the data and program.

A display may be attached to the remote power control device for user convenience. The remote power control device may also include an input device that allows the user to change supply power based on received data. In addition, the remote monitoring controller 160 is provided with the second transceiver 150 to transmit or receive information such as data and signals to or from the first transceiver 140.

FIG. 2 is an enlarged circuit diagram showing only the power regulator for power control in the remote power control device. The power regulator 130 includes a winding 131, a first tap 132, a second tap 133, a third tap 134, a first switch S1, a second switch S2, and a third switch S3. Although the power regulator 130 also includes an input line 181, an output line 182, and a common line 183 connected to the winding 131, a description of these components will not be described since they are known in the art.

The power regulator 130 operates in the following manner. In the case of an autotransformer, a primary winding and a secondary winding are wound on one core and taps are mounted at intervals of a predetermined length on the primary winding to form the secondary winding.

Accordingly, in the present invention, in order to allow the numbers of turns of both the primary winding and the secondary winding to be changed, the first tap 132, the second tap 133, and the third tap 134 are connected to the primary winding at different positions thereof and the first switch S1, the second switch S2, and the third switch S3 are connected respectively between the taps and the common line 183. Of course, each of the switches S1, S2, and S3 may be implemented through a circuit such as a relay, a TRIAC, an SCR, or an IC so as to perform a switching operation.

Figure 3:
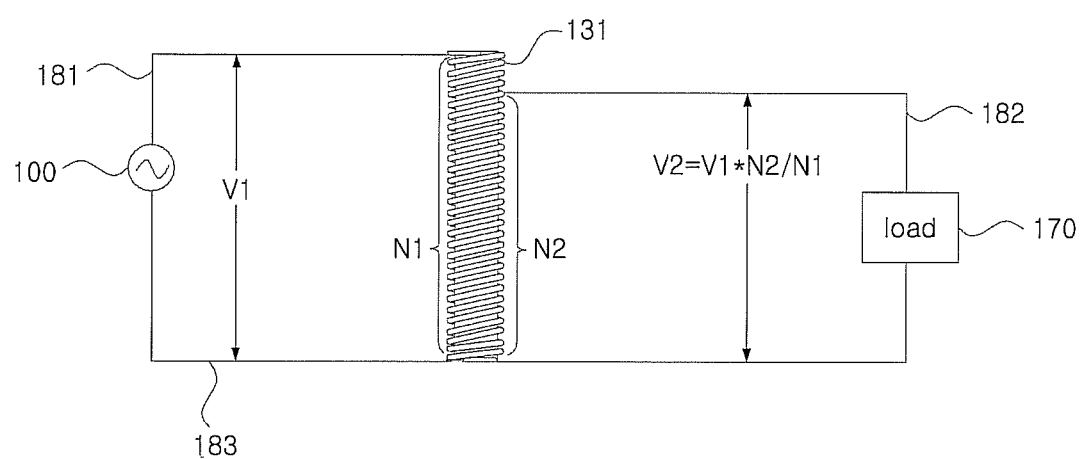
FIG. 3 is an equivalent circuit diagram of the power regulator when a first switch S1 is closed in the power regulator.

A description will now be given of an equivalent circuit diagram of the power regulator 130 when each of the switches S1, S2, and S3 connected to the common line 183 is closed. First, FIG. 3 illustrates an example in which the first switch S1 is closed. That is, when the first switch S1 connected to the first tap 132 is closed, the first tap 132 is connected to the common line 183 to create N1 primary turns (i.e., a primary winding having N1 turns) and N2 secondary turns (i.e., a secondary winding having N2 turns).

In this case, a voltage applied to the N1 primary turns is V1 and a voltage applied to the N2 secondary turns is V2 (=V1*N2/N1). That is, when the first switch S1 is closed, N2 secondary turns, the number of which is proportional to the number of N1 primary turns, are created and the N2 secondary turns are excited by the N1 primary turns to generate an output voltage V2.

Figure 4:
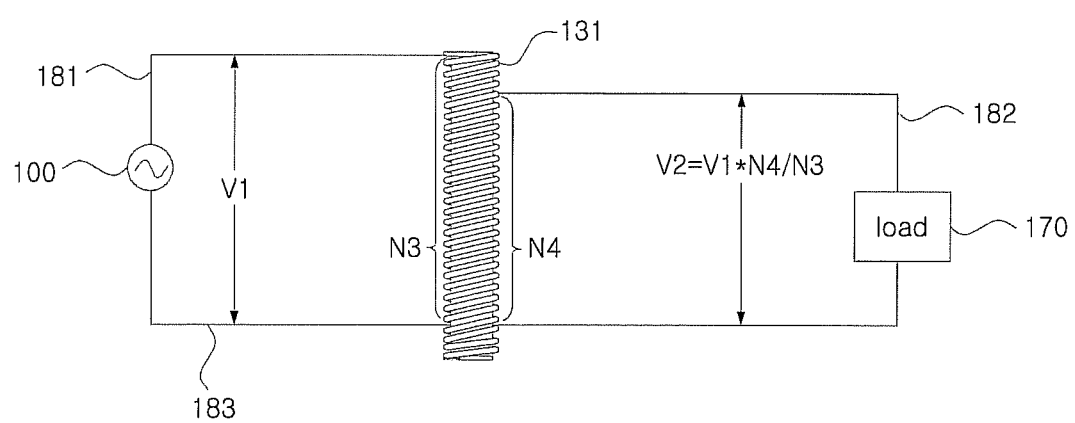
FIG. 4 is an equivalent circuit diagram of the power regulator when a second switch S2 is closed in the power regulator.

Reference will now be made to FIG. 4 which is an equivalent circuit diagram of the power regulator 130 when the second switch S2 is closed in the power regulator 130. That is, when the second switch S2 connected to the second tap 133 is closed, the second tap 133 is connected to the common line 183 to create N3 primary turns (i.e., a primary winding having N3 turns) and N4 secondary turns (i.e., a secondary winding having N4 turns).

In this case, a voltage applied to the N3 primary turns is V1 and a voltage applied to the N4 secondary turns is V2 (=V1*N4/N3).

Here, the voltages V1 and V2 are different from those applied to the first tap 132 when the first switch S1 is closed. As shown, voltages input to and output from the windings are different since the lengths of the windings are different. Voltages input to and output from the windings are also different in the following case where the third switch S3 connected to the third tap 134 is closed.

Accordingly, N4 secondary turns, the number of which is proportional to the number of N3 primary turns, are created and the N4 secondary turns are excited by the N3 primary turns to generate an output voltage V2. This is illustrated in FIG. 4.

Figure 5:
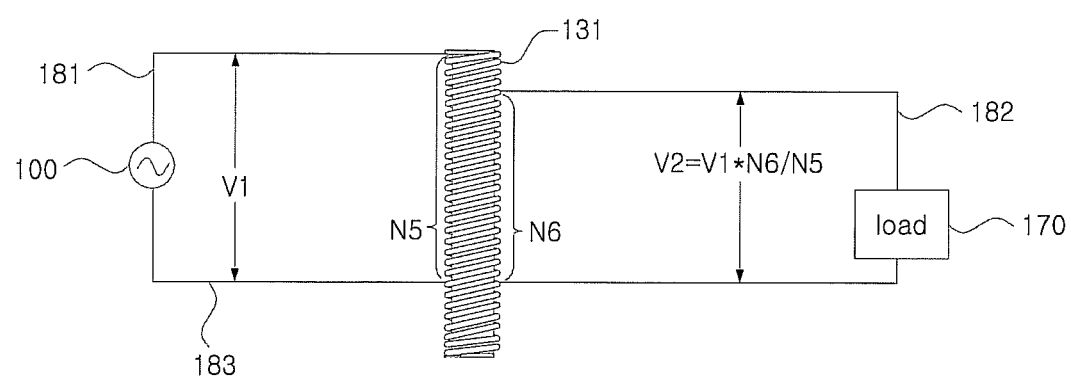
FIG. 5 is an equivalent circuit diagram of the power regulator when the third switch S3 is closed in the power regulator.

Finally, a description is given with reference to FIG. 5 which is an equivalent circuit diagram of the power regulator 130 when the third switch S3 is closed in the power regulator 130. That is, when the third switch S3 connected to the third tap 134 is closed, the third tap 134 is connected to the common line 183 to create N5 primary turns and N6 secondary turns.

In this case, a voltage applied to the N5 primary turns is V1 and a voltage applied to the N6 secondary turns is V2 (=V1*N6/N5).

The following is a further explanation with reference to FIGS. 2 to 5. The ratio of the numbers of turns of the windings is 1:7:1:1 when the switches S1, S2, and S3 are opened. The ratio when each of the switches S1, S2, and S3 is closed is as follows.

1) The ratio of the number of turns of the primary winding to the number of turns of the secondary winding is N2/N1 when the first switch S1 is closed.

2) The ratio of the number of turns of the primary winding to the number of turns of the secondary winding is N4/N3 when the second switch S2 is closed.

3) The ratio of the number of turns of the primary winding to the number of turns of the secondary winding is N6/N5 when the third switch S3 is closed.

Accordingly, the ratios N2/N1, N4/N3, and N6/N5 are 9/10, 8/9, and 7/8 (=0.9, 0.88, and 0.87). Therefore, N2/N1>N4/N3>N6/N5

The secondary voltage is expressed by the following Equation.

Secondary voltage=Primary voltage*the number of turns of secondary winding/the number of turns of primary winding [Equation 1]

That is, highest power (or voltage) is transferred to the secondary winding when the first switch S1 is closed, lower power is transferred to the secondary winding when the second switch S2 is closed, and lowest power is transferred to the secondary winding when the third switch S3 is closed.

Accordingly, the present invention can perform finer power adjustment since the numbers of turns of both the primary winding and the secondary winding are changed unlike the conventional power regulator in which only the secondary winding is changed. That is, according to the present invention, the ratio of the numbers of turns of the windings can be more accurately and finely adjusted, for example, to 0.88 and 0.87 as described above. On the other hand, according to the conventional method, the number of turns of the secondary winding should be accurately adjusted when there is a need to fabricate a product suitable for generating the secondary voltage described above using the same number of turns of the primary winding as described above. For example, in order to obtain a ratio of "0.88," it is necessary to accurately wind secondary turns, the number of which is 8.8 relative to 10 primary turns. This makes manufacture difficult and requires very fine processes.

Although 3 taps and 3 switches connected to the 3 taps are provided in the above example, this example is purely for better understanding of the present invention and it is possible to configure a larger number of taps and switches.

Figure 6:
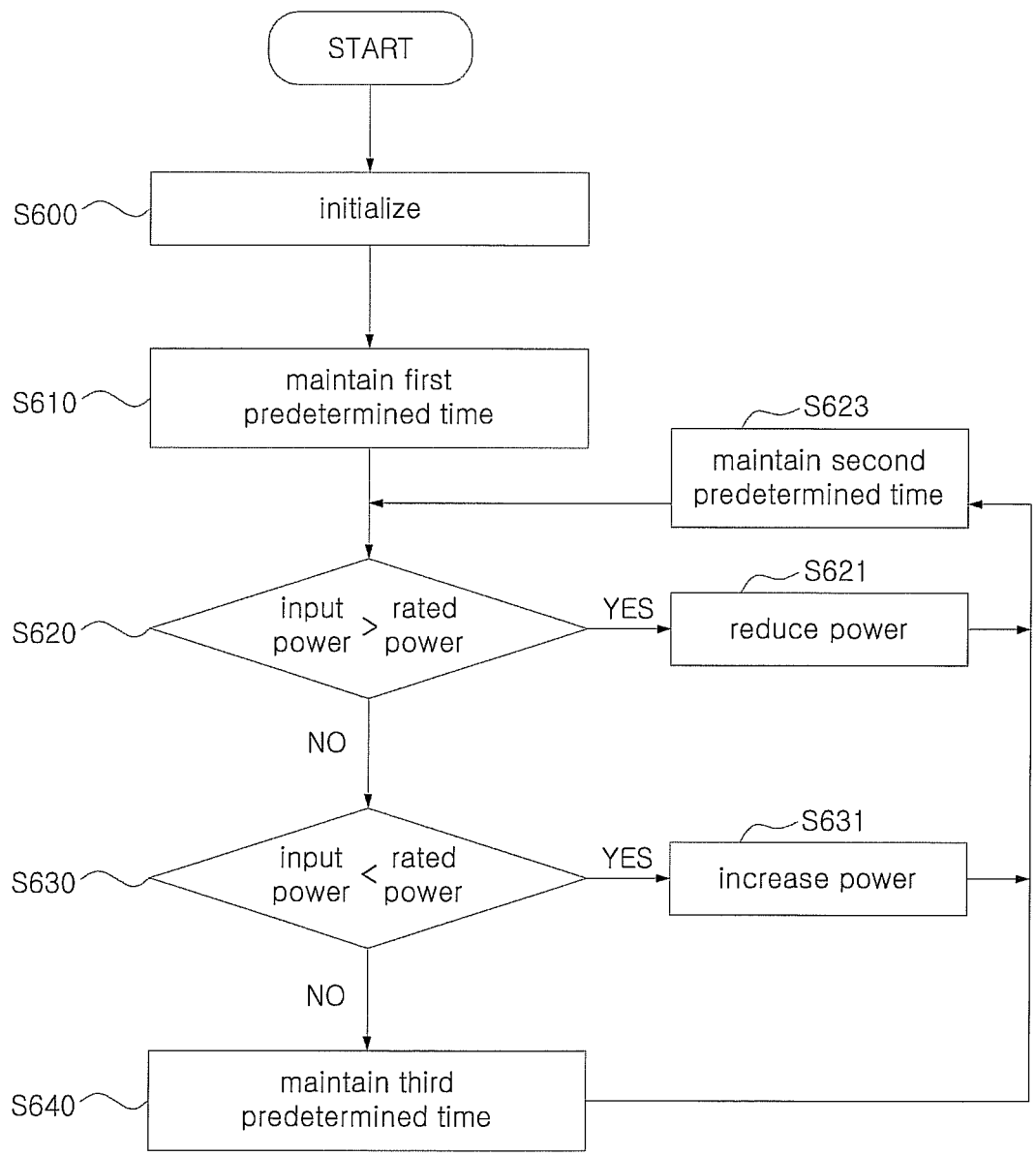
FIG. 6 is a flow chart illustrating a procedure for monitoring primary power and remotely controlling power according to an embodiment of the present invention.

Next, such a power change procedure will be described with reference to FIGS. 6 and 1. FIG. 6 is a flow chart illustrating a procedure for monitoring primary power and remotely controlling power according to an embodiment of the present invention.

Some products such as a load including a motor or a lamp may require different powers when they start up and when they finish starting up. Thus, the controller 120 of FIG. 1 performs an initialization process (step S600) and then maintains the rated power, i.e., power output from the power source 100 of FIG. 1, for a predetermined time which will be referred to as a first predetermined time (step S610).

After the power is maintained for the first predetermined time, the controller 120 of FIG. 1 determines whether or not the sensed input power is higher than the rated power (step S620).

Upon determining that the input power is higher than the rated power, the controller 120 transmits a control signal for decreasing the output power to the power regulator 130 to change the output power (step S621) and maintains the changed power for a predetermined time which will be referred to as a second predetermined time (step S622). Thereafter, the step S620 is repeated.

On the other hand, upon determining at step S620 that the input power is not higher than the rated power, the controller 120 determines whether or not the input power is less than the rated power (step S630).

Upon determining that the input power is less than the rated power, the controller 120 transmits a control signal for increasing the output power to the power regulator 130 to change the output power (step S631) and maintains the changed power for the second predetermined time (step S622). Thereafter, the step S620 is repeated.

On the other hand, upon determining at step S630 that the input power is not less than the rated power, the controller 120 maintains the input power as an output power for a predetermined time which will be referred to as a third predetermined time (step S640). That is, the controller 120 applies the input power as an output power to the load 170 without changing the input power.

Although the above control procedure has been described with reference to an example in which power input from the power source 100 of FIG. 1 to the power regulator 130 is sensed, the present invention may also sense output power to control the power as described above.

The following is an additional explanation of the control procedure described in FIG. 6 for better understanding. Rated power is supplied for a predetermined time required when a load starts up to enable the load to reliably start up. After the load finishes starting up, the power is increased or reduced so that power suitable for load conditions required for normal operation is supplied to the load, thereby enabling the load to operate smoothly and suitably according to installation conditions.

In addition, an initial condition and a power transformation condition can be efficiently determined based on data acquired through remote inspection.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A remote power control device comprising a power regulator comprising:
    a power input line;
    a primary winding connected to the power input line and wound on a core;
    a secondary winding, at least part of the secondary winding being in common with the primary winding;
    at least one tap connected to the primary winding at a predetermined position thereof to specify respective numbers of turns of the primary winding and the secondary winding;
    at least one switch having one end connected respectively to the at least one tap and another end connected to a common line to change the respective numbers of turns of the primary winding and the secondary winding; and
    an output line for outputting power that the secondary winding generates as the secondary winding is excited by the primary winding,
    wherein the respective numbers of turns of both the primary winding and the secondary winding are determined as one of the at least one switch is closed;
    a sensor unit connected to at least one of the power input line and the power output line of the power regulator to sense at least one of an input power and an output power; and
    a controller for comparing power sensed by the sensor unit with a preset value and transmitting a control signal for changing output power of the power regulator based on the comparison,
    wherein the controller uniformly maintains the output power for a first predetermined time required to start a load connected to the power output line, and
    wherein the controller determines whether the sensed input power is higher than a higher preset value or lower than a lower preset value after the output power is maintained for the first predetermined time, upon determining that the input power is higher than the higher preset value or lower than the lower preset value, the controller decreases or increases the output power, respectively, and uniformly maintains the decreased or increased output power for a second predetermined time, and upon determining that the input power is not higher than the higher preset value and not lower than the lower preset value, the controller uniformly maintains the output power for a third predetermined time.

2. The remote power control device according to claim 1, wherein the at least one tap and the at least one switch are connected from a lower end of the primary winding, highest power is transferred to the secondary winding when a first switch from the lower end of the primary winding is closed, lowest power is transferred to the secondary winding when a last switch from the lower end of the primary winding is closed.

3. The remote power control device according to claim 1, wherein the sensor unit senses current or voltage applied to at least one of the power input line and the power output line.

4. The remote power control device according to claim 1, wherein the controller switches one of the at least one switch of the power regulator to change the output power of the power regulator.

5. The remote power control device according to claim 1, further comprising a wired or wireless communication unit for transmitting information regarding the input power or the output power sensed by the sensor unit out of the remote power control device and receiving information regarding change of the output power of the power regulator from outside the remote power control device.

6. The remote power control device according to claim 5, further comprising a display for displaying information regarding the power sensed by the sensor unit, and a remote monitoring controller for remotely, controlling the output power of the power regulator based on user input.

7. The remote power control device according to claim 3, further comprising a wired or wireless communication unit for transmitting information regarding the input power or the output power sensed by the sensor unit out of the remote power control device and receiving information regarding change of the output power of the power regulator from outside the remote power control device.

8. The remote power control device according to claim 7, further comprising a display for displaying information regarding the power sensed by the sensor unit, and a remote monitoring controller for remotely controlling the output power of the power regulator based on user input.

* * * * *